United States Patent [19]

Hillgenberg

[11] 4,104,349
[45] Aug. 1, 1978

[54] METHOD OF MAKING A PERFORATED, MOLDED CONTAINER

[76] Inventor: David E. Hillgenberg, 551 W. Parkwood Ave., La Habra, Calif. 90631

[21] Appl. No.: 655,667

[22] Filed: Feb. 4, 1976

[51] Int. Cl.² .................. B29C 17/03; B29C 17/10
[52] U.S. Cl. .................. 264/153; 264/155; 264/161; 264/163; 264/250; 264/294; 264/322
[58] Field of Search .................. 264/163, 154–156, 264/294, 296, 161, 321, 153, 90, 92, 322, 250; 425/290, 306, 292

[56] References Cited

U.S. PATENT DOCUMENTS

| | | | |
|---|---|---|---|
| 1,972,789 | 9/1934 | Newkirk | 425/306 |
| 2,393,549 | 1/1946 | McCreery | 425/290 |
| 3,165,787 | 1/1965 | Carmack | 264/156 |
| 3,427,688 | 2/1969 | Wilson | 425/292 |
| 3,461,761 | 8/1969 | Mojonnier | 264/163 |
| 3,822,161 | 7/1974 | Haase | 264/163 |
| 3,828,631 | 8/1974 | Spengler et al. | 83/636 |
| 3,949,046 | 4/1976 | Proctor | 264/296 |

*Primary Examiner*—Willard E. Hoag

[57] ABSTRACT

Method of making a molded container for potted plants from a sheet of organic polymer, is molded in one piece from a sheet of organic polymer material. Rigidity is provided by a peripheral solid lip formed with a horizontally extending lower surface and convexly curved upper surface. One or more drainage apertures are formed through the bottom wall of the container by limited vertical shearing eliminating waste and permitting adjacent portions to be strengthened and raised to dispose the aperture above a supporting surface. In molding the container, a strap of serrated steel is used to cut through the sheet material to define the outer edge of the container lip.

9 Claims, 7 Drawing Figures

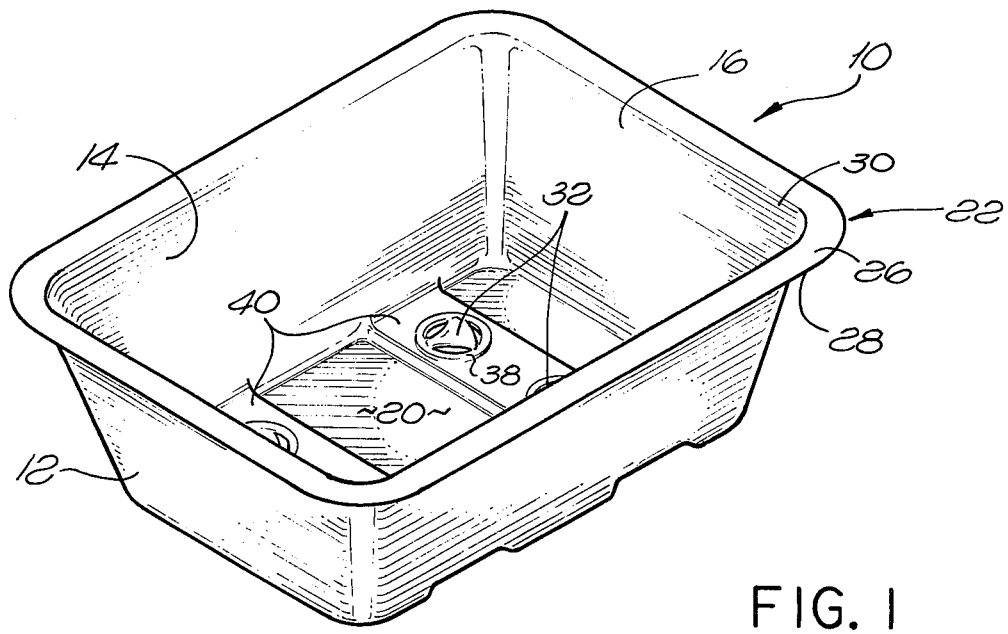
FIG. 1
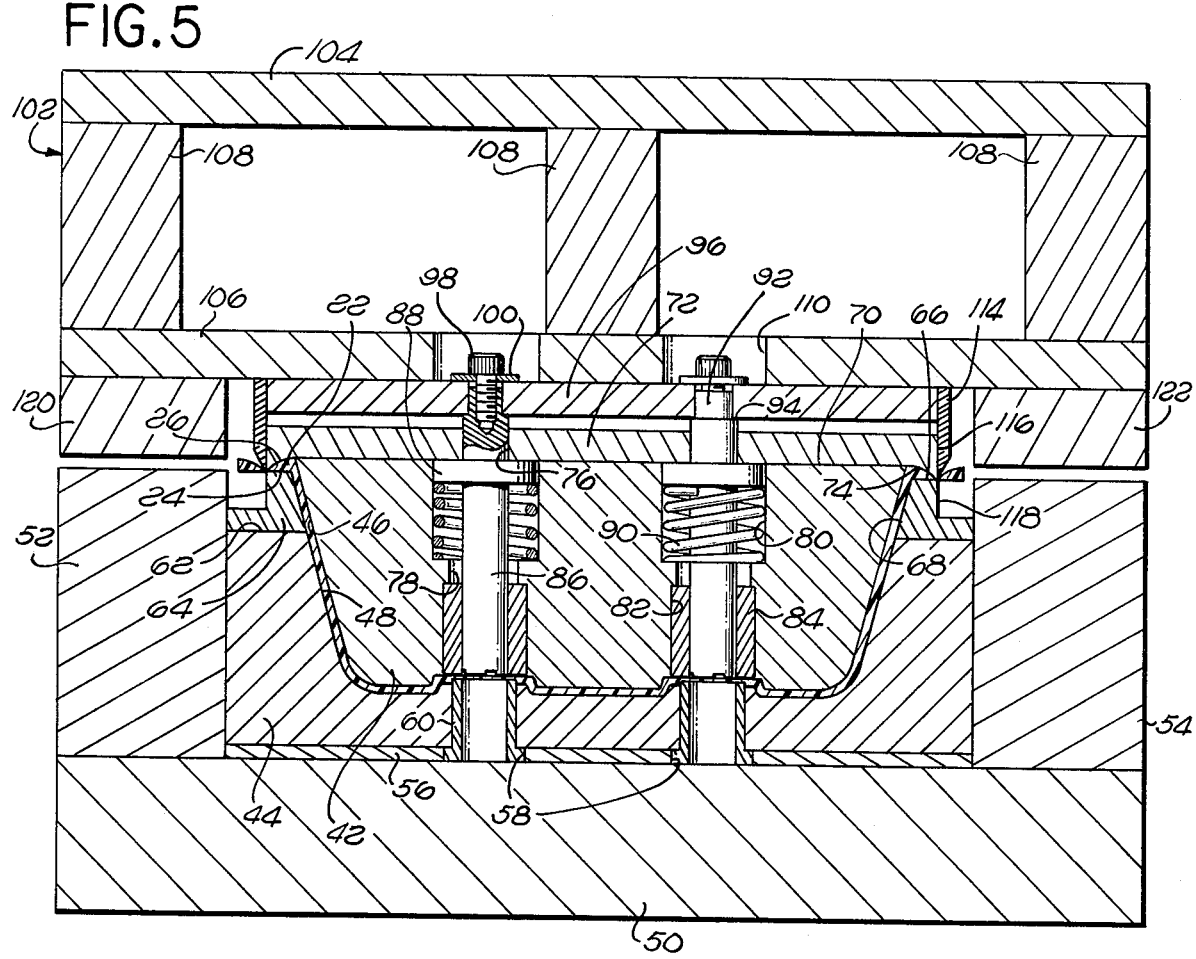

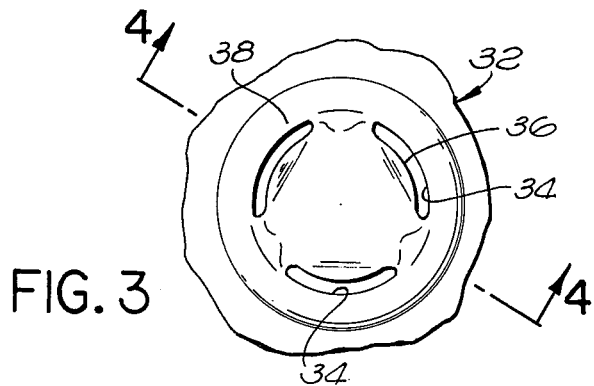
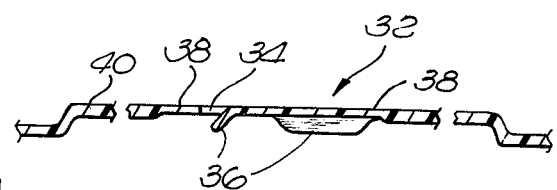
FIG. 3  FIG. 4
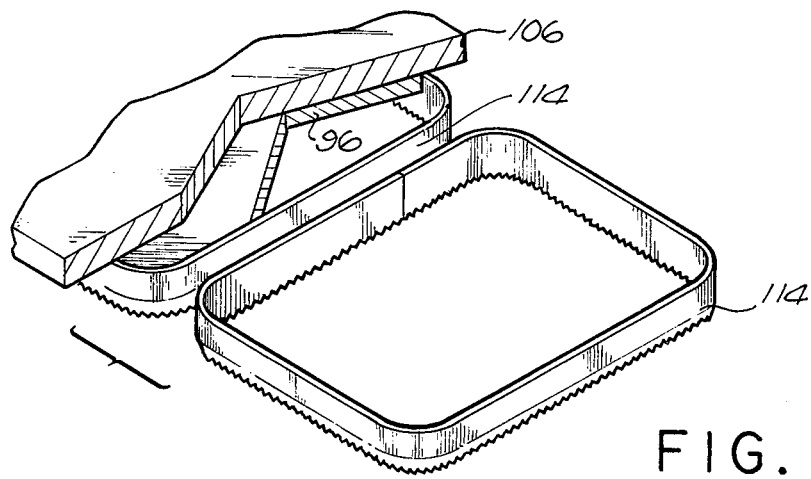
FIG. 6
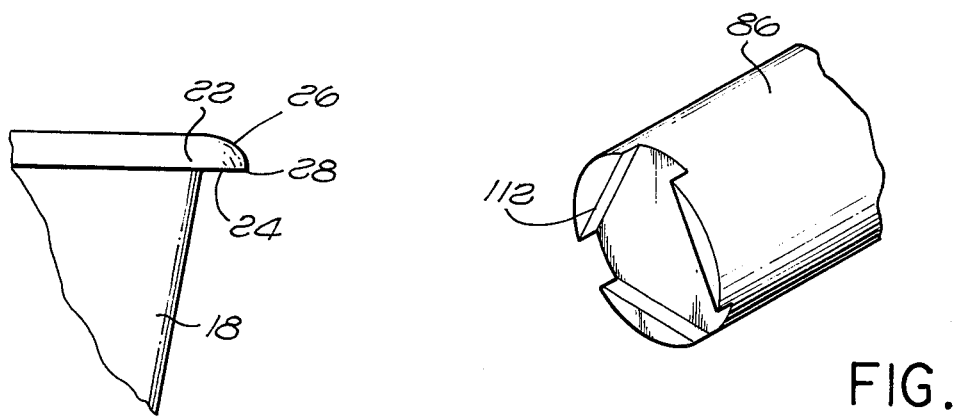
FIG. 2  FIG. 7

METHOD OF MAKING A PERFORATED, MOLDED CONTAINER

FIELD OF THE INVENTION

The field of art to which the invention pertains includes the field of plastic article shaping, more specifically as relates to the formation of apertured molded containers and molds therefor.

BACKGROUND AND SUMMARY OF THE INVENTION

Molded plastic containers, more specifically containers molded from organic polymer material, have been available in numerous shapes and for a variety of purposes ranging from egg cartons and hamburger packs to seedling containers and lightbulb packages. Particularly when the container is formed of expanded organic polymer material such as expanded polystyrene, the containers possess heat insulation and cushioning properties which make them very desirable for the foregoing uses. However, when such containers are made in an open hollow shape, substantially beyond the small size of a hamburger pack or egg carton, the inherent flexibility of the material works to its disadvantage and the containers generally have insufficient rigidity to be useful in such larger size ranges. Such disadvantage is particularly noted in containers which are used for carrying potted plants or the like. Such containers generally require a substantial internal volume compared to wall thickness and the loose soil used in potting is capable of exerting pressures in all directions with the result that a simple container constructed of expanded organic polymer material too readily gives way.

Additionally, containers for potted plants require one or more drainage openings in the bottom wall. The provision of such openings does not lend itself well to the continuous formation of the containers. In the usual method of forming a container of expanded polymer material, a wide, continuous sheet of plastic material is heated to soften it for molding, and the sheet is advanced between the parts of a multi-cavity mold. The mold parts are pressed together to form the containers while they are cooled to fix the polymer material in its molded shape, whereupon the mold parts are separated and the process is repeated indefinitely. While it is a simple matter to design the mold die surfaces so that a portion of the sheet material is punched out during mold formation, to form drainage openings, the vacuum cleaning system required for such operation is often inadequate for removing all waste material. Such material is often left over in the mold cavity and then is entrained in the outer surface of the next container molded in that cavity, marring that container in appearance by the presence of the waste material embedded in its surface. As a result, an inordinate number of rejects is experienced when openings are attempted to be made in the same operation that molds the container. Accordingly, a subsequent punching step is required. However, such a step necessitates feeding the molded carton from the molding station to a punching station where they are registered with punching equipment that includes male and female dies actuated to punch out the openings at the desired location in each carton. The slugs of punched out material must then be vacuumed away and the cartons fed to a cutting and trimming station that cuts them out of the large sheets and separates them for stacking. The hole punching equipment adds appreciably to the cost of the basic machine and also considerably increases the size and weight of the machine. Precisely adjusted equipment is required for registering the cartons accurately with the hole punching equipment so that the openings are properly spaced. Hole punching equipment causes many problems and a significant percentage of cartons must be scrapped because of various malfunctions of this accessory. Similarly, the cutting and trimming station adds appreciably to the cost of the basic machinery and requires additional precision registration equipment.

The present invention provides molding equipment and a container design which overcomes the foregoing difficulties and disadvantages. A container design is provided which has sufficient inherent rigidity so that expanded organic polymer material, such as expanded polystyrene, can be used in the construction of a relatively large size container for potted plants. Additionally, molding equipment is provided which enables the ready formation of such a container which combines molding, drainage hole "punching" and container cutting in one mold operation. The present invention eliminates a hole punching station and eliminates a cutting station to provide a fully formed potted plant container with drainage openings and of rigid construction, in a single operation.

Specifically, a one-piece container is provided molded from organic polymer material. The container has an integral side wall structure, a bottom wall molded integral with the side wall structure and an upper peripheral solid lip entirely around and extending outwardly from the side wall structure and molded integral therewith. The lip provides rigidity and strength to the container by being formed with a horizontally extending flat lower surface and an upper surface convexly curved from the outer edge of the lip to the side wall structure. More specifically, the upper lip surface curves from the flat lower lip surface to the inner surface of the side wall structure. The side wall structure can be cylindrical or oval in cross section, or in a preferred embodiment as illustrated herein, can be formed of four side walls, each tapering outwardly from the bottom wall so that one container is stackable within another container.

Drainage openings are formed through the bottom wall by separating, without removing, a portion of the bottom wall and extending it outwardly from the remaining portion. This is accomplished by limited vertical shearing during the molding operation, as will hereinafter be described and enables the formation of a drainage aperture without any waste material. The mold is designed so as to raise the region of the bottom wall adjacent the drainage opening sufficiently above the remaining portions of the bottom wall so that the drainage opening is disposed a pre-set distance above a supporting surface. The material immediately adjacent the drainage opening is compressed together completely therearound to strengthen that region.

The mold utilized to provide the present structure includes male and female mold parts having their die surfaces in confronting relation and shaped to contour the surfaces of the sheet to form the container. The mold parts are spaced one from the other a distance sufficient to permit the insertion of a sheet or organic polymer material between the die surfaces which are formed with confronting annular regions for defining a peripheral lip for the container. The container is cut and trimmed during the molding operation by means of a steel ruled trim die. The trim die is in the form of a strap of serrated steel slidably disposed entirely around the male mold part with its serrates pointing downwardly and closely adjacent the outer edge of the male mold part. As the male and female mold parts are moved together to form a container, the steel strap is slid downwardly so that the serrates tear through the sheet of organic material to define the outer edge of the container lip. The serrated steel strap is supported by a plate which is mounted for reciprocal movement over the male mold part and spring loaded to a position spaced vertically from the male mold part. As the plate is pushed downwardly during the molding operation, it pushes the male mold part into the female mold part against the sheet material and simultaneously the serrated steel strap moves downwardly to cut the container from the sheet material.

The male mold part is formed with an opening into which is slidably disposed a sharp-edged hole former. The hole former is connected to the reciprocal plate through the opening in the male mold part and shears a drainage opening through the sheet material upon reciprocation of the plate. The movement of the plate is limited to a distance sufficient to form an opening through the sheet material but insufficient to entirely remove the material that is sheared away. Rather, the material is merely extended outwardly from the bottom of the formed container. In a specific embodiment, the leading edge of the hole former is discontinuously shaped so as to form the aperture by separating a plurality of portions of the bottom container wall and extending those separated portions away from the adjacent region of the bottom wall.

BRIEF DESCRIPTION OF THE DRAWINGS

FIG. 1 is a perspective view of a container in accordance with the present invention;

FIG. 2 is a fragmentary elevational view of one corner of the container of FIG. 1;

FIG. 3 is a fragmentary plan view of a drainage aperture of the container of FIG. 1;

FIG. 4 is a cross-sectional view taken on the line 4—4 of FIG. 3;

FIG. 5 is a cross-sectional view of male and female mold parts and associated components of a molding station for forming the container of FIG. 1;

FIG. 6 is a perspective view of a serrated steel strap and an adjacent strap of like construction and fragments of associated components, utilized herein; and FIG. 7 is a perspective view of the terminal end of a hole former utilized herein.

DETAILED DESCRIPTION

As required, a detailed illustrative embodiment of the invention is disclosed herein. However, it is to be understood that the embodiment merely exemplifies the invention which may take forms that are different from the specific illustrated embodiment disclosed. Therefore, specific structural and functional details are not to be interpreted as necessarily limiting, but as a basis for the claims which define the scope of the invention.

Referring to FIG. 1, there is shown a container 10 constructed in accordance with this invention and which includes side walls 12, 14, 16 and 18 integrally molded with a bottom wall 20 so as to provide a one-piece container in accordance with the present invention. The container is molded from a sheet of organic polymer material, preferably of the expanded type, such as expanded polyethylene, expanded polypropylene and, more preferably, expanded polystyrene. The latter material possesses particular properties of compressibility and thermal insulation which make it particularly advantageous to use in construction of the present containers. A plurality of the containers are formed simultaneously by passing an elongate sheet of the organic polymer material between the confronting surfaces of a bank of molds, as will hereinafter be discussed in more detail.

In accordance with one feature of the present invention, the container is provided with a peripheral lip 22. A detail of the lip 22 is illustrated in FIG. 2 and a cross-section can be seen in FIG. 5. The lip is solid throughout and includes a flat portion 24 which extends horizontally at an obtuse angle with respect to the side walls. The upper surface 26 of the lip is convexly curved and forms a sharp outer edge 28. The lip extends from the flat lower lip surface 24 at the edge 28 to the inner surface 30 (FIG. 1) of the side wall structure. As a result of this configuration, a degree of rigidity is provided enabling the container to be used for the shipment and storage of potted plants.

Referring to FIGS. 3 and 4 in conjunction with FIG. 1, in another feature of the present invention, a plurality of drains 32 are formed in the bottom wall 20, but the drains 32 are not simply openings through the bottom wall but are formed with specific structure. In particular, each drain 32 includes one, or preferably more, drainage openings 34 formed by separating a portion 36 (FIGS. 3 and 4) of the bottom wall by shearing from adjacent portions of the drain 32 region. By using such drain construction, one need not create any waste material. Accordingly, the drain openings 34 can be formed in a single step operation without the requirement of a separate hole punching station.

As a further feature, at the time of forming the openings 34, the bottom wall material is compressed together in a region adjacent each drain 32 so as to provide a compressed, strengthened region 38 as a ring around the drain 32.

As above noted, in forming the drains 32, portions of the bottom wall are extended downwardly. In order to accomodate such extension, the regions of the bottom wall 20 adjacent the strengthened drains 32 are raised upwardly with respect to remaining portions of the bottom wall to provide platform regions 40 (FIGS. 1 and 4). The platform regions 40 are riased upwardly a distance greater than the downward extent of the separated aperture portions 36 so as to dispose the separated portions a preset distance above a supporting surface, a distance sufficient so that the separated portions 36 clear the supporting surface. The result additionally enables the apertures 34 to be spaced from a supporting surface permitting airflow thereunder for appropriate drainage and aeration of the potted plant carried in the container 10.

Referring now to FIG. 5, there is illustrated in cross section a single molding station which is identical to a plurality of molding stations in tandem therewith in a direction into the drawing sheet (the general layout of such tandem molding stations is indicated in the partial view shown in FIG. 6). Each molding station includes male and female mold parts 42 and 44, respectively, formed with confronting die surfaces 46 and 48, respectively, shaped to contour the surfaces of a sheet of organic polymer material inserted therebetween to form the container of FIG. 1. The mold parts are disposed in a housing formed by an aluminum plate 50 serving as a floor for a plurality of the molds and a pair of elongate aluminum bars 52 and 54 serving as walls of the housing and which extend lengthwise of the floor plate 50 on opposite sides thereof. Thinner aluminum plates are used to secure the individual mold stations to the housing and a bottom section 56 thereof is shown in the drawing. The bottom section 56 is formed with apertures 58 each serving to locate a bushing 60 which extends through the bottom of the female mold 44 at positions corresponding to the desired location of the drains 32 (FIG. 1). The bushings 60 are cylindrically hollow and serve as relief region for formation of the drain apertures, as will be hereinafter described in more detail. Additionally, the top edge of the bushings 60 extend slightly above the surface of the female mold 44 thereat, to provide a narrower, compression region 38 around the drain.

The top edge 62 of the female mold carries an annular steel plate 64. The top and inner side surfaces 66 and 68, respectively, of the steel plate 64 serve as additional die surfaces for the female mold and, together with the remaining portions of the female mold define the outer surface and contours of the container of FIG. 1.

The male mold 42 is formed with a flat top surface 70 which carries an aluminum plate 72. The plate 72 is formed to overlap the steel plate 64 of the female mold 44 and serves to provide an annular die surface 72 for defining the upper contour of the container lip 26 (FIG. 1). In this regard, the bottom overlap surface 74 of the male mold plate 72 is concavely formed so as to cooperate with the flat, horizontally extending upper surface of the female mold steel plate 64 to form the container peripheral lip 22 as a solid bead having a flat undersurface and convex upper surface, as hereinabove described.

The aluminum plate 72 carried on the male mold 42 is formed with a plurality of apertures 76 located in alignment with the bushings 60 of the female mold 44. Holes are drilled through the male mold 42 from opposite sides thereof for alignment with the plate apertures 76 and bushings 60 and each such hole is separated by a reduced diameter portion 78 to define upper and lower chambers 80 and 82, respectively. A press fit bushing 84 is inserted into each lower chamber 82 and serves to slidably receive a drill rod 86. Each drill rod 86 is fitted with an upper stop plate 88 formed for slidable movement within the upper housing between the stop plate 88 and the reduced diameter portion 78 of the male mold. The stop plate continues upwardly as an internally threaded stud 92 and is formed with an annular shoulder 94. A travel plate 96 is disposed on the stud shoulders 94 and secured to the stud 92 by means of threaded bolts 98 and washers 100. The stud shoulder 94 is located at a precise distance above the surface of the mold plate 72 so as to precisely define the extension of the drill rod 86 when the travel plate 72 is lowered.

The spring 90 presses between the reduced diameter portion 78 of the male mold 42 and the bottom surface of the stop plate 88 on the drill rod, so as to spring-load the travel plate 96 to its upper position as shown in the drawing. The travel plate 96 carries a framework formed of upper and lower aluminum plates 104 and 106, respectively, spaced by means of a plurality of aluminum bars 108. The lower framework plate 106 is formed with a plurality of apertures 110 located to accomodate the stud bolts 98 and washers 100. The upper and lower framework plates 104 and 106 and spacing bars 108 are welded together and the bottom framework plate 106 is welded to the travel plate 96 so as to move therewith as a single unit.

It will be appreciated that as pressure is applied to the top framework plate 104 it is transmitted to the travel plate 96 and pushes the travel plate 96 downwardly which, in turn, slidably moves the drill rods 86 downwardly through the male mold bushings 84, through the organic polymer sheet material between the male mold 42 and female mold 44, and thence a short distance into the hollow cylindrical space of the female mold bushing 60.

Referring additionally, to FIG. 7, the terminal end of a drill rod 86 is illustrated. The drill rod 86 serves as a hole former and has its leading edge 112 sharply formed. In accordance with the present embodiment, the leading edge 112 is shaped discontinuously so as to form a plurality of apertures through the sheet material. The discontinuous sharp edges extend downwardly from the main stock of the drill rod a short distance, only slightly greater than the length of travel of the travel plate 96. By such means, portions of the sheet material are shorn and separated from adjacent portions, but the extent of travel is not sufficient to impact the sheet material immediately below the central portion of the drill rod to a degree sufficient to tear that central portion away from the sheet material. Accordingly, and referring to FIGS. 3 and 4, a drain is formed with a plurality of apertures 34 having the shorn sheet material 36 extending downwardly from the adjacent portions of the sheet material, but not entirely separated therefrom.

Referring to FIG. 6 in conjunction with FIG. 5, another aspect of the present invention is illustrated. A steel rule blade in the form of a strap 114 of serrated steel is disposed in annular configuration entirely around the travel plate 96 and is welded thereto with its serrates pointed downwardly. The strap 114 serrates are disposed closely adjacent the outer edge 116 of the male mold plate 72 so as to slide downwardly along the plate edge 116 during downward movement of the travel plate 96. It will be seen that the serrated steel strap 114 girdles the male mold plate 72 entirely around its outer periphery. To accomodate the downward motion of the strap 114, the annular steel plate 64, carried by the female mold 44, is cut away to form a vertical downwardly extending flat peripheral portion 118 which lies adjacent the inner surface of the serrated strap during its downward travel. The bottom plate 106 of the framework 102 carries spacer bars 120 and 122 welded to the plate 106 and which are disposed confronting the elongate housing bars 52 and 54, respectively, for interaction therewith when the framework 102 is pushed downwardly to its lowermost position. The spacer bars 120 and 122 serve as a stop to check the downward movement of the travel plate 96. Accordingly, the spacer bars 120 and 122 are spaced a distance above the housing bars 52 and 54 which corresponds to the extent of travel of the hole forming drill rods 72 through the sheet material.

In operation, the framework 102 is raised a sufficient distance so that the bottom of the male mold part 42 clears the top of the annular steel plate 64 of the female mold 44 and is raised a further distance to enable the insertion, in a direction going into the drawing, of an elongate sheet of organic polymer material heated to its softening point. Thereafter, the framework 102 is lowered, resulting in mold forming of the sheet to the configuration shown in FIG. 5. At that point, the travel plate 96 continues downwardly carrying the serrated steel strap through the material to cut away the container. By such means, a separate cutting station is made unnecessary. As the framework 102 travels further downwardly, pushing the travel plate 96, the hole forming drill rods 86 are pushed downwardly against the force of the spring 80 until the sharp edges thereof protrude through the material and extend the material thereat a small distance below the surface of the immediately adjacent material, as hereinabove described. Simultaneously, compression rings 38 are formed around each drain 32. It will be appreciated that spring loading of the travel plate 96 is sufficiently strong so as to prevent movement of the travel plate 96 until the male mold has moved to its position within the female mold as shown in FIG. 5. As a result of the operation herein, an aperture is formed without the necessity of a separate punching station.

Accordingly, there has been shown apparatus and methods for forming a container of unique construction having advantages as hereinbefore described in a most economical and facile manner.

I claim:

1. In the molding of a container by forming a softened sheet of organic polymer material between male and female mold parts in which said sheet is disposed over a female die surface arranged on said female mold part to define the side and bottom walls of said container and said male mold part includes a male die surface arranged to close with said female mold part, the improvement for forming a peripheral lip entirely around the top edge of said container, sand improvement comprising:
   providing an annular region on said female die surface for defining a peripheral lip of said container;
   slidably disposing a blade of steel entirely around said male mold part said blade being formed with serrates pointing downwardly and closely adjacent the outer edge of said male mold parts;
   moving said mold parts together to form said container; and
   thereafter sliding said blade downwardly so that said serrates tear through said sheet of organic material to define the outer edge of said lip,
   molding said container bottom so as to form at least one platform region displaced inwardly from surrounding portions of the container bottom and perforating said at least one platform region while said material is between said male and female mold parts by moving a punch member relative said mold parts and through said platform regions.

2. The improvement of claim 1 in which the annular region of said female die surface is formed with a flat portion extending horizontally inwardly of said edge to said side walls and said male die surface is concavely formed in an annular region inwardly adjacent said blade, so as to form said peripheral lip with a convexly curved upper surface and a horizontally extending flat lower surface.

3. The improvement of claim 1 in which the annular region of said female die surface is formed with a vertical downwardly extending flat peripheral portion adjacent the inner vertical line of travel of the inner surface of said blade.

4. The improvement of claim 1 in which said blade is supported on a reciprocally movable plate over said male mold part, said plate being spring-loaded to a position spaced vertically from said male mold part.

5. The improvement of claim 4 in which said mold parts are shaped to define side and bottom walls of said container, and including the step of forming at least one aperture in the bottom wall of said container by disposing a sharp edged hole former connected to said plate and slidable through said male mold part whereby said hole former shears through said sheet material upon reciprocation of said plate to separate a portion of said bottom wall from a first adjacent region of said bottom wall while retaining connection with a second adjacent region, and extending said separated portion to a position spaced from said first adjacent region.

6. The improvement of claim 5 in which said sheet material is compressible and including the step of compressing said sheet material during formation of said aperture in a local region completely around said aperture to provide increased rigidity in said sheet material locally around said aperture relative to adjacent sheet material spaced from said aperture.

7. In the molding of a container by forming a softened sheet of organic polymer material between male and female mold parts in which said sheet is disposed over a female die surface arranged on said female mold part to define the side and bottom walls of said container and said male mold part includes a male die surface arranged to close with said female mold part, said improvement comprising:
   moving said mold parts together to reshape said material into the form of a container and molding portions of the container bottom so as to form at least one platform region displaced inwardly from surrounding portions of the container bottom and perforating said at least one platform region while said material is between said male and female mold parts by moving a punch member relative said mold parts and through said at least one platform region.

8. The improvement of claim 7 in which said mold parts are shaped to define side and bottom walls of said container, and including the step of forming at least one aperture in the bottom wall of said container by disposing a sharp edged hole former connected to a plate and slidable through said male mold part whereby said hole former shears through said sheet material upon reciprocation of said plate to separate a portion of said bottom wall from a first adjacent region of said bottom wall while retaining connection with a second adjacent region, and extending said separated portion to a position spaced from said first adjacent region.

9. The improvement of claim 8 in which said sheet material is compressible and including the step of compressing said sheet material during formation of said aperture in a local region completely around said aperture to provide increased rigidity in said sheet material locally around said aperture relative to adjacent sheet material spaced from said aperture.

* * * * *

UNITED STATES PATENT AND TRADEMARK OFFICE
CERTIFICATE OF CORRECTION

PATENT NO. : 4,104,349

DATED : August 1, 1978

INVENTOR(S) : David E. Hillgenberg

It is certified that error appears in the above—identified patent and that said Letters Patent are hereby corrected as shown below:

Column 2, line 64, delete "or" and substitute -- of --.

Signed and Sealed this

Twentieth Day of March 1979

[SEAL]

Attest:

RUTH C. MASON
Attesting Officer

DONALD W. BANNER
Commissioner of Patents and Trademarks